United States Patent [19]

Faust

[11] Patent Number: 5,661,842
[45] Date of Patent: Aug. 26, 1997

[54] METHOD FOR PROVIDING SUBMARINE CABLE JOINT PROTECTION AND INSULATION USING HEAT SHRINK TUBING

[75] Inventor: Michael Allen Faust, Oceanport, N.J.

[73] Assignee: AT&T, Middletown, N.J.

[21] Appl. No.: 451,298

[22] Filed: May 26, 1995

[51] Int. Cl.$^6$ ................................................ G02B 6/38
[52] U.S. Cl. ........................ 385/139; 385/99; 385/147; 174/93; 174/DIG. 8
[58] Field of Search ...................... 385/51, 95, 99, 385/134, 135, 139, 147; 174/DIG. 8, 93; 29/447, 869, 868

[56] References Cited

U.S. PATENT DOCUMENTS

| | | | |
|---|---|---|---|
| 4,487,994 | 12/1984 | Bahder | 174/DIG. 8 |
| 4,586,970 | 5/1986 | Ishise et al. | 174/DIG. 8 |
| 4,737,004 | 4/1988 | Amitay et al. | 385/49 |
| 5,066,095 | 11/1991 | Dekeyser et al. | 385/135 |

*Primary Examiner*—John Ngo
*Attorney, Agent, or Firm*—Mark K. Young

[57] ABSTRACT

A method for providing substantial protection and insulation for submarine cable joints without utilizing costly molding and x-ray equipment. A heat shrinkable polyolefin protective covering includes an unexpanded conical transition between two expanded cylindrical portions. The unexpanded conical transition precisely locates the protective covering against a conical portion of a submarine cable jointbox. Polyamide adhesive is applied to the inside surfaces of the protective covering. During the application of heat to the protective covering, insubstantial relative movement between the conical transition portion of the protective covering and the locating portion of the jointbox allows proper alignment of the protective covering as the expanded cylindrical portions shrink and move relative to the jointbox. The diameters of the cylindrical portions of the protective covering are selected such that a nominal hoop stress is created during heating to minimize air entrapment and voids in the adhesive. Two protective coverings are overlapped to maximize the dielectric strength of the coverings, and to increase the path length for water egress into the joint.

26 Claims, 5 Drawing Sheets

METHOD FOR PROVIDING SUBMARINE CABLE JOINT PROTECTION AND INSULATION USING HEAT SHRINK TUBING

CROSS REFERENCE TO RELATED APPLICATION

U.S. patent application Ser. No. 08/451,248 was filed concurrently herewith.

TECHNICAL FIELD

This invention relates to communications cables. More particularly, this invention relates to a method for providing submarine cable joint protection and insulation using heat shrink tubing.

BACKGROUND OF THE INVENTION

Optical fibers are in widespread use today as the information-carrying component of communications cables because of their large bandwidth capabilities and small size. However, they are mechanically fragile, exhibiting undesirable fracture under some tensile loads and degraded light transmission under some radial compressive loads due to a phenomena known as microbending loss. Optical fibers may be subjected to tensile loading during deployment and recovery operations of optical fiber cables. Radial compressive loads are typically exerted on the optical fibers as a result of hydrostatic water pressure in submarine applications. Radial compressive loads may also result from crush and impact from trawling, anchoring, and other ship-related activities. Optical fibers are also susceptible to a stress-accelerated chemical reaction between the glass material used in the optical fiber and water known as stress corrosion. Stress corrosion is a phenomena where small microcracks in the glass can increase in size which may adversely affect the mechanical and optical performance of the optical fiber cable. Optical losses in the fibers due to the diffusion of hydrogen into the interior of the optical fiber cable (where, for example, hydrogen may be produced from corrosion of metallic portions of the cable), represents another potential limitation on optical fiber cable performance.

Optical fiber cables often comprise one or more optical fibers, as well as non-optical elements such as strength members which bear the tensile and compressive loads placed on the cable while in operation. Some optical fiber cables may also employ electrically-conductive elements for carrying current to power repeaters, or for low-current signaling, for example. Optical fiber cables are typically joined together from a series of smaller segments to form long spans which may be used, for example, in transoceanic or other long-haul applications. The joint between the cable segments is often effectuated using what is conventionally known as a "jointbox." The jointbox, which is typically formed from high-strength materials including steel, houses the splices that provide a continuous optical path between individual optical fibers in the cable segments. In addition, the strength elements within the cable segments are typically joined using the jointbox to give the desired mechanical continuity to the optical fiber cable.

To protect the fragile optical fibers in the jointbox from environmental hazards (particularly, the damaging egress of water into the interior of the jointbox), and provide sufficient electrical insulation to any current-carrying elements that may be joined in the jointbox, some typical submarine optical fiber cables utilize a substantial polymer covering (often high-density polyethylene) that is molded directly around the jointbox in an "overmolding" process. While overmolding generally provides satisfactory results in some applications, it may not be cost-effective in other applications, because the required molding equipment is costly and the molding process is relatively slow which thereby restricts joining production rates. Moreover, in order to ensure proper integrity of the overmolded polymer covering, x-ray inspection is generally performed to detect voids and incomplete mold filling, among other defects, which represents additional equipment costs and adds to joint production time.

SUMMARY OF THE INVENTION

Accordingly, it is an object of the invention to provide substantial protection and insulation to the submarine cable joints. It is a further object of the invention to provide such protection and insulation in an efficient manner without utilizing costly molding and x-ray equipment.

These and other objects are satisfied, in accordance with the invention, by a novel method for protecting and insulating a jointbox which utilizes a protective covering having at least two hollow elements that are formed from a heat shrinkable material. The heat shrinkable material has an expanded state and an unexpanded state. Upon the application of heat, the heat shrinkable material in the expanded state shrinks such that it substantially returns to the unexpanded state. At least one of the elements forming the protective article is in the unexpanded state while other elements are in the expanded state. The hollow elements are coupled to constitute an integrally-formed single unit having a continuous passageway therethrough. The unexpanded element is positioned against a locating portion of jointbox so as to locate portions of said jointbox and cable segments within the passageway in a predetermined position such that said unexpanded first element and the locating portion undergo insubstantial relative movement as the protective covering is heated. Heating the protective covering causes the expanded elements to shrink such that they are disposed about predetermined portions of said jointbox and cable segments in a substantially close fitting manner.

Advantageously, the method described above facilitates installation of the protective covering because the insubstantial relative movement between the unexpanded element and the locating portion of the jointbox allows proper alignment of the protective covering and jointbox to be maintained even as the expanded elements of the covering shrink and move relative to the jointbox and cable segments during the heating step.

In an illustrative example of the invention, the protective covering is formed from heat shrinkable polyolefin tubes which are arranged as an expanded first substantially cylindrical portion, an expanded second substantially cylindrical portion having a relatively smaller diameter than the first portion, and an unexpanded conical transition portion which couples the first and second portions. The unexpanded conical transition portion functions to precisely locate the protective article against a similarly shaped termination socket portion of the jointbox. An adhesive is applied to portions of the inside surfaces of the protective covering. After cleaning and heating the cable segments and jointbox to enhance adhesion of the adhesive, the protective covering is positioned and heated to cause the cylindrical portions to shrink such that they are disposed around predetermined portions of the jointbox and cable segments in a substantially close fitting manner. The diameters of the cylindrical portions of the article in the unexpanded state are selected such that a nominal hoop stress is created in these portions during heating to thereby minimize air entrapment and voids in the adhesive. Two protective coverings are overlapped to maximize the dielectric strength of the coverings, and to increase the path length for water egress into the joint.

DETAILED DESCRIPTION OF THE INVENTION

The following section will describe the invention with respect to specific embodiments such as overall size, geometry, dimensions and materials used to protect and insulate a jointbox connecting communications cable segments which comes within the scope of the invention. However, the invention is not limited to the specific dimensions or materials used in the following description, nor is it limited solely to cable applications. As will become evident in the discussion that follows, the invention described below is useful in any application where cost-effective protection and/or insulation for a device or article is desired.

Figure 1:
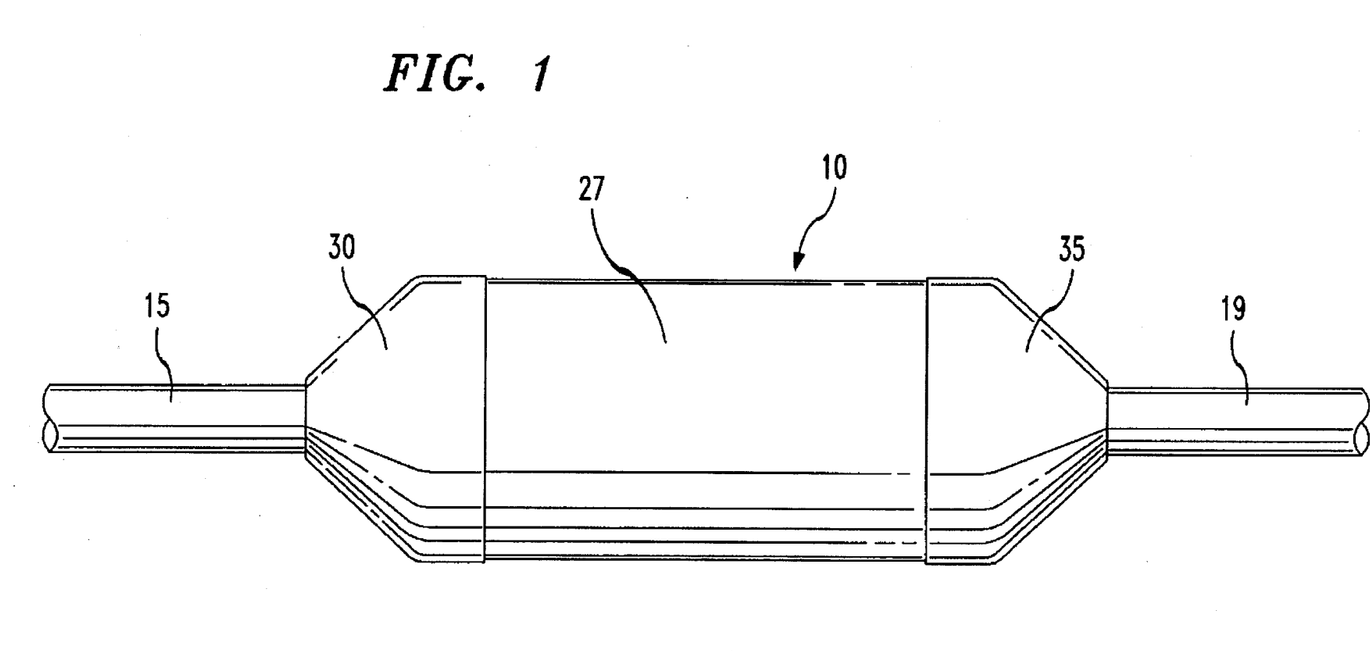
FIG. 1 is a side view of an illustrative jointbox and cable segments which is useful in illustrating the principles of the invention.
Figure 2:
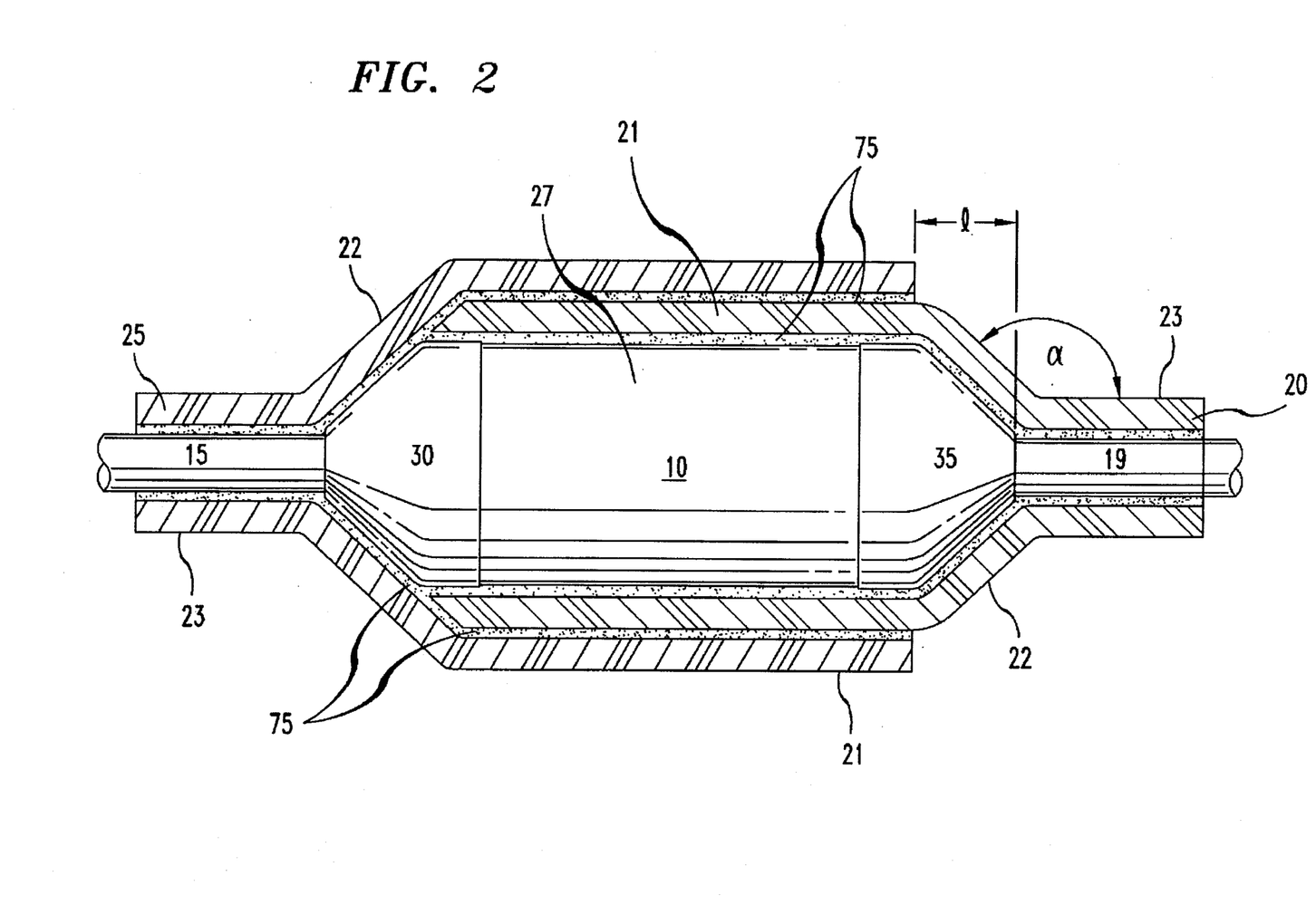
FIG. 2 shows the illustrative jointbox and cable segments shown in FIG. 1 and further provides a cross-sectional view of protective coverings, in accordance with the invention.

FIG. 1 is a side view of a jointbox 10 and cable segments 15 and 19 which is useful in illustrating the principles of the invention. Referring now to FIG. 2, there is shown a side view of the illustrative jointbox 10 and cable segments 15 and 19 shown in FIG. 1., and further provides a cross-sectional view of the protective covers 20 and 25 which incorporate the principles of the invention. It is noted that the jointbox and cable segments shown in the figures, and described below, are merely illustrative. It is contemplated that the principles of the invention may be readily applied to many jointbox and cable designs, including cables used in both terrestrial and submarine applications.

Jointbox 10 is coupled to cable segments 15 and 19. Cable segments 15 and 19 are typically joined by jointboxes, such as jointbox 10, to form larger cables or systems which may be deployed, for example, as part of a larger communications system such as an long-haul undersea communications system. The following information concerning the architecture of cable segments 15 and 19 is provided for illustrative purposes only. It is emphasized that the invention is applicable to many cable designs, however, the particular details of the cable design are not required to facilitate practice of the invention. Cable segments 15 and 19 typically include optical fibers which may, for example, be disposed in a cable core. Disposed about the cable core, in an annular fashion, are metal strength members. An annular exterior insulating jacket is then disposed about the strength members to complete the cable segment. Cable segments 15 and 19 may also include current carrying elements such as copper sheathing which may be disposed between the strength members and exterior insulating jacket. In this illustrative example, the exterior insulating jacket is formed from polyethylene, for example, high-density polyethylene. Those skilled in the art will recognize that strength members are typically used to carry tensile and compressive loads applied to cable segments 15 and 19. Jointbox 10 includes, in this illustrative example, a substantially cylindrical, metallic housing 27 which is coupled to termination sockets 30 and 35. Termination sockets 30 and 35 are utilized to mechanically couple cable segments 15 and 19, respectively, to jointbox 10. Termination sockets 30 and 35, in this illustrative example, are metallic elements which are mechanically fastened using conventional fastening means to the metal strength members of cable segments 15 and 19. It is noted that the full diameter of the cable segment, including the exterior insulating jacket, may enter the termination socket, as illustrated in FIGS. 1 and 2, or some of the annular insulting jacket may be stripped away along some portion of the proximal ends of the cable segments to thereby expose the underlying strength members or sheathing. Termination sockets 30 and 35 are coupled via intermediate coupling means (not shown), for example, using a threaded connection, so that mechanical loads may be transferred from cable segment 15 to cable segment 19, and vice versa, such that mechanical continuity is provided to the larger communication cable formed by the joining of the cable segments. Termination sockets 30 and 35, in this illustrative example, are shaped as a frustum (i.e., they have a substantially conical configuration in which the portion of the cone above a plane which is parallel to the cone's base is removed) as shown in FIGS. 1 and 2. However, it is emphasized that the selection of his particular shape for termination sockets 30 and 35 is merely illustrative, as the invention is intended to encompass other termination socket shapes. The large end of the cone abuts the end of cylindrical housing 27 and the smaller end of the cone includes an opening to permit passage of the cable segments into the interior space of jointbox 10. In some jointbox designs, the termination sockets may be fastened to the housing, using, for example, conventional fastening means, such that the housing also is a load-bearing member of the cable joint.

Housing 27 is utilized to create an interior space in jointbox 10 which contains the aforementioned intermediate coupling means. Jointbox 10 also contains a receptacle for containing the individual splices (not shown) that are typically used to provide a continuous optical path between the individual optical fibers that are contained in cable segments 15 and 19. In some jointboxes, such intermediate coupling means and receptacle may be integrally formed. It is noted that the interior space of jointbox 10 and the contents therein, are not particularly pertinent to the invention at hand, therefore, no further details regarding such space and contents are provided herein.

Disposed around jointbox 10 and cable segments 15 and 19, in an annular manner, are protective coverings 20 and 25, as shown in FIG. 2. Protective coverings 20 and 25 are utilized, in accordance with the principles of the invention, to provide the cable joint with both mechanical protection against environmental hazards (such as water egress into the interior of jointbox 10), and electrical insulation to any current carrying elements that may be joined within jointbox 10. As noted above, such functionality heretofore was typically provided using elaborate and expensive polyethylene overmoldings. A single layer of protective covering is utilized around exterior areas of the proximal ends of cable segments 15 and 19 and around the exterior surfaces of conical termination sockets 30 and 35. Two layers are provided about housing 27 by the utilization of overlapping protective coverings. Advantageously, the use of overlapping protective coverings maximizes the dielectric strength of the insulation provided by the coverings, and further maximizes the path length water must traverse to reach jointbox 10.

Figure 3:
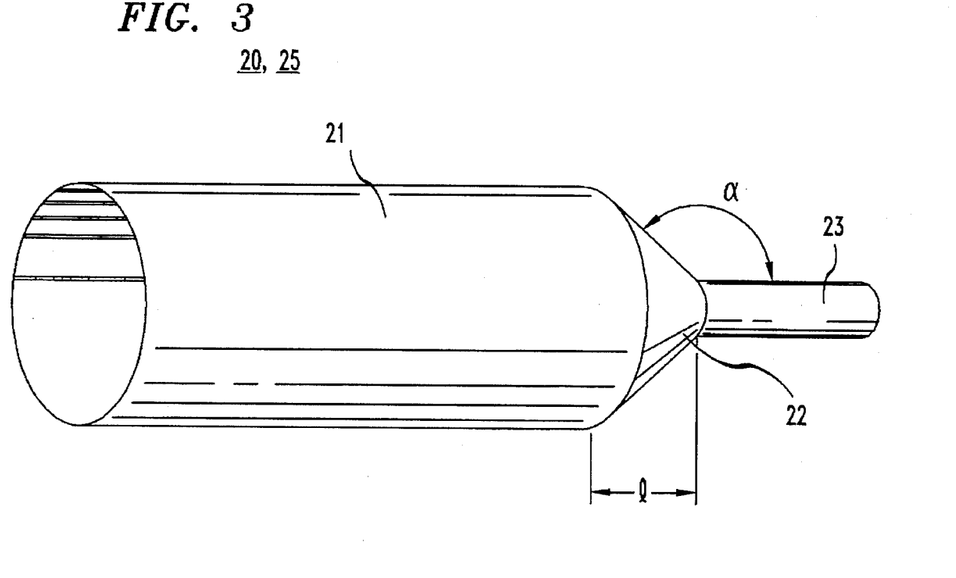
FIG. 3 shows an illustrative example of a protective covering in an original molded configuration, in accordance with the invention
Figure 4:
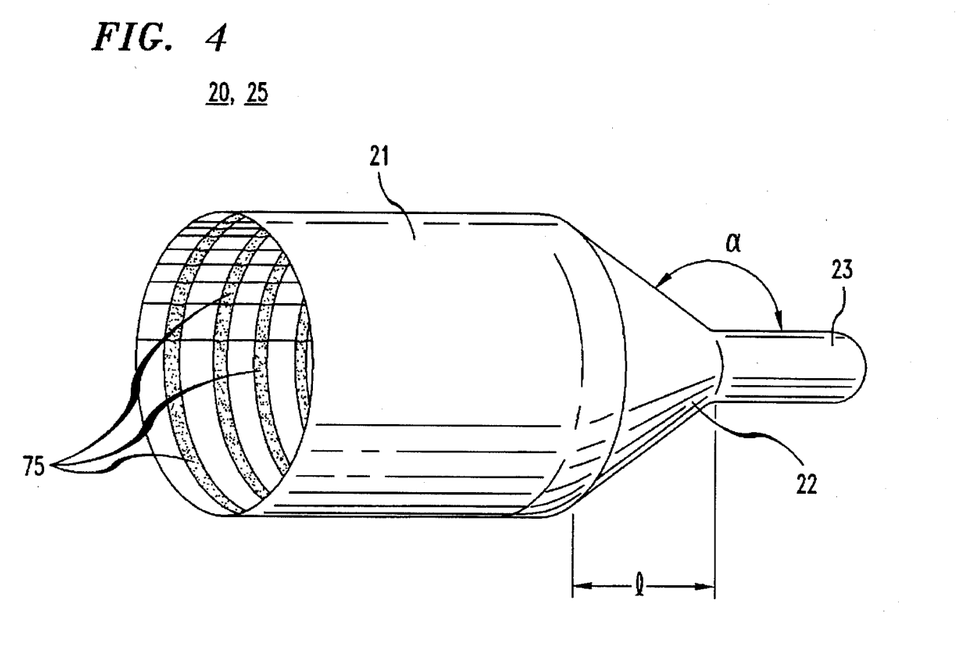
FIG. 4 shows an illustrative example of a protective covering in an expanded configuration, in accordance with the invention.

Protective coverings 20 and 25 are formed from molded, heat-shrinkable tubes. While tubes having substantially circular cross-sections are utilized in this illustrative example, it is emphasized that other cross-sections, for example, rectangular cross-sections, are intended to fall within the scope of the invention. Heat shrinkable materials are known, and include, for example, polyolefin polymeric materials. In some applications of the invention, it may be advantageous for protective coverings 20 and 25 to be identically configured to reduce the number of different parts required to provide joint protection and insulation. As shown in FIGS. 2-4, each protective covering includes a first substantially cylindrical portion 21; a second substantially cylindrical portion 23 having a relatively smaller diameter than the first portion; and, a conical transition portion 22 which couples the first and second portions. The preferred material for protective coverings 20 and 25 is a semi-rigid polyolefin material which is commercially available from the Raychem Corporation. While other known heat-shrinkable polymers are also contemplated as being useful in some applications of the invention, these materials are somewhat less preferred. In this illustrative example, a polyamide adhesive is applied to the inside surface (i.e., on the concave side) of the cylindrical portions of protective coverings 20 and 25. A preferred adhesive is supplied under the designation "S-1017" by Raychem Corporation. In some applications, it may also be desirable to apply such adhesive to the inside surface of the conical transition portions of protective coverings 20 and 25. This adhesive is shown in FIGS. 2 and 4 and represented by reference numeral 75. It is noted that while the use of adhesive is generally preferred, it may be desirable to omit the adhesive in some applications of the invention, particularly those in which environmental conditions are less severe, as in shallow-water conditions, or when cables are anticipated to be in service for a relatively short time period, for example. In FIG. 2, adhesive 75 is embodied as a continuous layer. In FIG. 4, an alternative adhesive embodiment is illustrated where it is applied in a spiral bead. It should be noted that during the application of heat in the heat shrinking process (described below) such an adhesive bead may spread such that a continuous adhesive layer is formed. It is noted that any adhesive application pattern is intended to fall within the scope of the invention.

As will be appreciated by those skilled in the heat shrink tubing arts, protective coverings 20 and 25 are first molded to a predetermined molded (i.e., unexpanded) configuration, and then expanded to a predetermined expanded configuration where several dimensions of the protective coverings (particularly, the diameters of the first and second cylindrical portions 21 and 23, as defined above) are increased to facilitate their installation over the jointbox and optical fiber cable segments. As used herein, the term "molded configuration" refers to the configuration of the protective coverings as molded. The term "expanded configuration" refers to the configuration of the protective coverings after the aforementioned expansion step. FIG. 3 shows protective coverings 20 and 25 in the molded configuration. FIG. 4 shows protective coverings 20 and 25 in the expanded configuration. Once positioned over jointbox 10, the application of heat to protective coverings 20 and 25 will cause them to shrink such that they substantially return to their original molded configuration.

In this illustrative example, the dimensions of the first and second cylindrical portions of the protective coverings in the molded configuration are selected to be slightly undersized in comparison to the respective outside diameters of housing 27 and cable segments 15 and 19. This slight undersizing creates a nominal hoop stress in the cylindrical sections of the protective coverings which is, advantageously, sufficient to minimize air entrapment and voids in adhesive 75 as protective coverings 20 and 25 shrink down in size upon the application of heat. It is noted that such an advantage could not be obtained using conventional non-heat shrinking materials such as the molded plastics that are typically used to protect and insulate cable jointboxes.

Referring again to FIGS. 3 and 4, these figures show that cylindrical portions 21 and 23 of protective coverings 20 and 25, in the molded configuration, are expanded in diameter, using for example, a conventional mandrel or other expansion tooling, in order to arrive at the expanded configuration. However, conical transition portion 22 of protective coverings 20 and 25, in this illustrative example, maintains substantially constant length and wall angle in both its molded and expanded configurations. The length of the conical transition portion of protective coverings 20 and 25 is denoted by dimension "l" and the wall angle is denoted by angle "α" in the figures. This result is achieved because, in accordance with the principles of the invention, only cylindrical portions 21 and 23 of protective coverings 20 and 25 are expanded, while conical transition portion 22 is intentionally left unexpanded. Such a scheme allows the length l and wall angle α to be maintained substantially constant as the protective covers shrink back to their original molded configuration upon the application of heat. FIGS. 3 and 4 further illustrate that the overall length of the expanded protective coverings 20 and 25 is shorter relative to the molded configuration. Thus, those skilled in the art will recognize that, during the application of heat, protective covers 20 and 25 will expand in length (in the axial direction) as cylindrical portions 21 and 23 shrink in diameter.

Figure 5:
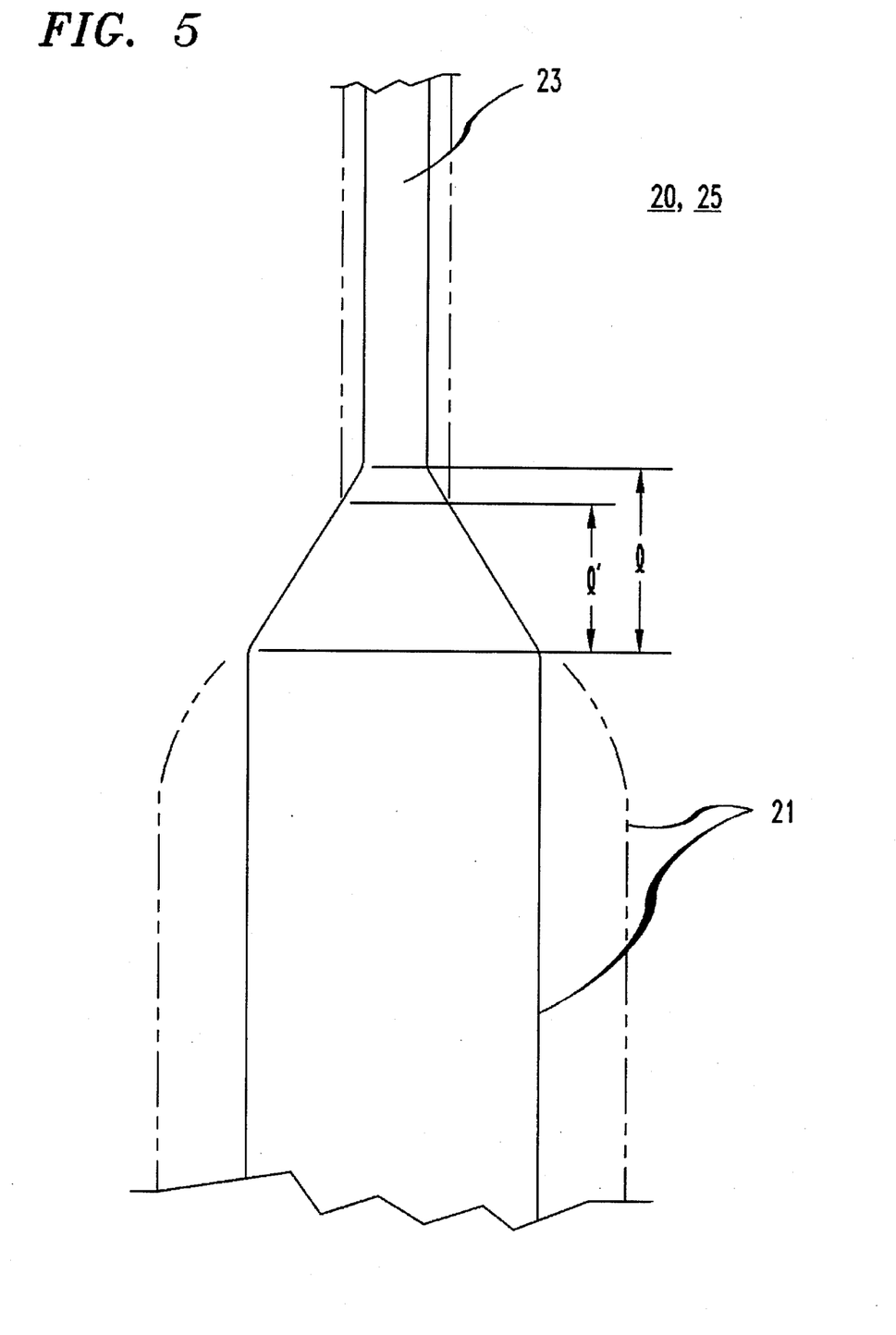
FIGS. 5 and 6 show side views of protective coverings to illustrate aspects of the invention.
Figure 6:
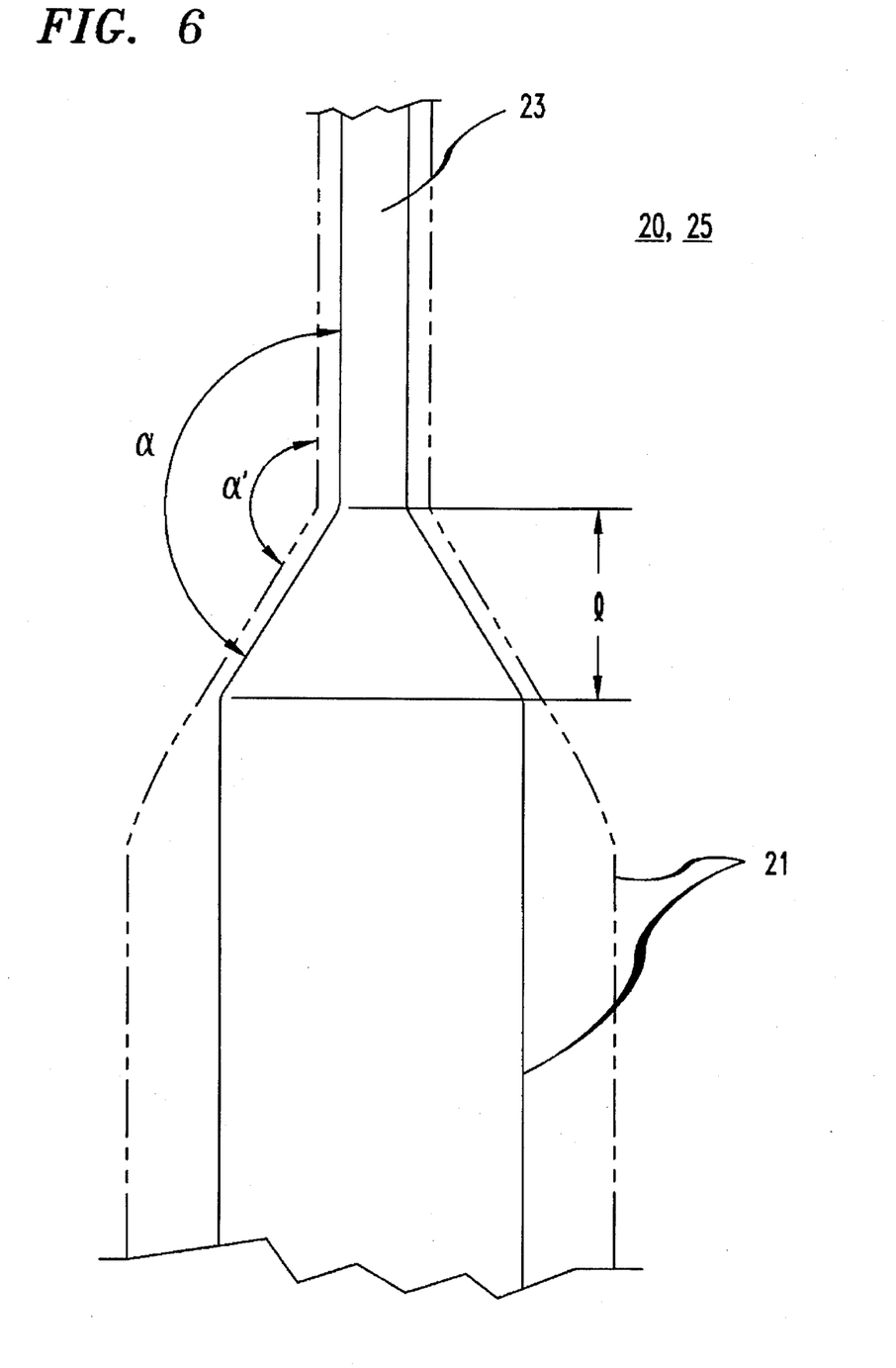

The maintenance of a substantially constant length l and wall angle α throughout the shrinking process advantageously allows the conical transition portion of protective coverings 20 and 25 to be precisely located in relation to jointbox 10. Specifically, the wall angle α is selected to substantially match the corresponding angle of termination sockets 30 and 35. Because length l and wall angle α are maintained substantially constant during the heat shrinking process, there is only insubstantial relative movement between conical transition portion 22 of protective coverings 20 and 25 and termination sockets 30 and 35, respectively, even as the cylindrical portions 21 and 23 expand outward in the axial direction as their diameters shrink. Such precise location of conical transition portion 22 further allows the cylindrical portions of protective coverings 20 and 25 to be precisely located in relation to jointbox 10 which, advantageously, facilitates the installation of the protective coverings. This precise location feature further ensures that protective coverings 20 and 25 are properly aligned and overlapped during installation to maximize their protection and insulation functions in accordance with their intended design. While it is recognized that some change to length l and/or wall angle α will likely occur during expansion, it is intended that this change be insubstantial so that the locating feature discussed above may be realized. Specifically, as shown in FIG. 5, length l may decrease slightly to length l' to accommodate the increase in diameter of the second cylindrical portion 23 of protective coverings 20 and 25 during the aforementioned expansion step. In FIG. 5, the molded configuration is represented by the solid line and the expanded configuration is represented by the dotted line. Alternatively, as shown in FIG. 6, the wall angle $\alpha$ may increase slightly to $\alpha'$. It is also recognized that it may be desirable, in some applications of the invention, to vary both length l and $\alpha$, in insubstantial amounts, to accommodate the diameter increase of the aforementioned second cylindrical portion of protective coverings 20 and 25.

A description of the preferred method of installation of protective coverings 20 and 25 is now presented. The method starts by slipping protective coverings 20 and 25 onto cable segments 15 and 19, respectively. Cable segments 15 and 19 are then coupled to termination sockets 30 and 35, splicing of the optical fibers is performed, etc., so that the jointbox is complete and ready to accept insulation and protection. Cable segments 15 and 19 are next prepared by roughening the surface of the proximal ends of the segments. Such surface roughening may be accomplished, for example, by reciprocating a length of sandpaper about the proximal ends of the cable segments such that a set of small circumferential (but not axial) grooves are created in the exterior insulating jacket. The use of 150 grit aluminum oxide sandpaper gives satisfactory results in the surface roughening step. Next, the entire surface of the proximal ends of cable segments 15 and 19, as well as jointbox 10, are thoroughly cleaned with a cleaning agent to remove undesired foreign substances. Isopropyl alcohol is one example of a suitable cleaning agent. If the annular insulating jacket does not enter termination sockets 30 and 35, as discussed above, tape comprising the aforementioned S-1017 adhesive is preferably wound around the exposed strength members or copper sheathing until the outer diameter of the cable segments is reached. The proximal end of cable segment 19 is then flame-treated, for example, using a propane torch. Such flame treatment has proven, advantageously, to enhance the adhesion of adhesive layer 75. Housing 27 is also heated to promote adhesion, for example using a torch, or using resistance heating means such as a heating blanket, heating tape, or band heater.

Protective covering 20 is then positioned over jointbox 10 and cable segment 19 using the aforementioned locating feature. Heat is applied, using for example, a torch, first from the conical transition portion 22, and then to the cylindrical portions 21 and 23 of protective covering 20 so that the cylindrical portions shrink starting at the ends of the conical transition portion and then progressively outward in both axial directions. Such a heating process helps to minimize air entrapment and voids in adhesive layer 75. After heat shrinking, protective covering 20 is roughened with sandpaper to create a series of circumferential grooves, and thoroughly cleaned with a cleaning agent such as isopropyl alcohol. The proximal end of cable segment 15 is flame-treated in a similar manner as described above. Jointbox 10 and the previously installed protective covering 20 are also heated. Protective covering 25 is then positioned and located over jointbox 10 and cable segment 15 in a similar manner as with protective covering 20. Heat is applied to protective covering 25, in a similar manner as described above, so that the cylindrical portions shrink starting at the ends of the conical transition portion and then progressively outward in both axial directions.

It will be understood that the particular techniques described above are only illustrative of the principles of the present invention, and that various modifications could be made by those skilled in the art without departing from the scope and spirit of the present invention, which is limited only by the claims that follow.

The invention claimed is:

1. A method for protecting and insulating a jointbox, said jointbox being coupled to the proximal ends of at least two of a plurality of cable segments forming a cable, the method comprising the steps of:

a) providing an article of manufacture including at least two hollow elements, each of said at least two elements being formed from a heat shrinkable material, said heat shrinkable material having an expanded state and an unexpanded state, wherein one of said at least two elements is in said unexpanded state, a second one of said at least two elements is in said expanded state, and said at least two elements are coupled to constitute an integrally-formed single unit having a continuous passageway therethrough, b) positioning said unexpanded first element against a locating portion of jointbox so as to locate portions of said jointbox and cable segments within said passageway in a predetermined position such that said unexpanded first element and said locating portion have insubstantial relative movement as said article is heated in accordance with heating step c); and c) heating said article such that said second element shrinks to substantially attain said unexpanded state to thereby cause said second element to be disposed about predetermined portions of said jointbox and cable segments in a substantially close fitting manner.

2. The method as claimed in claim 1 wherein selected ones of said elements are tubular.

3. The method as claimed in claim 1 wherein selected ones of said elements have a rectangular cross section.

4. The method as claimed in claim 1 wherein selected ones of said elements are formed from a polymer.

5. The method as claimed in claim 4 wherein said polymer is polyolefin.

6. The method as claimed in claim 5 wherein said polyolefin polymer is semi-rigid.

7. The method as claimed in claim 1 wherein selected surfaces of said article are coated with an adhesive.

8. The method as claimed in claim 7 wherein said adhesive is a polyamide adhesive.

9. The method as claimed in claim 1 further including a step d) comprising:

positioning an unexpanded first element of a second article manufacture which is provided in accordance with step a) against a locating portion of jointbox so as to locate portions of said jointbox and cable segments within said passageway in a predetermined position such that said unexpanded first element and said locating portion have insubstantial relative movement as said article is subsequently heated.

10. The method as claimed in claim 9 further including a step e) comprising:

heating said second article such that said second element shrinks to substantially attain said unexpanded state to thereby cause said second elements to be disposed about predetermined portions of said first article and said jointbox and cable segments in a substantially close fitting manner.

11. A method for protecting and insulating a jointbox, said jointbox being coupled to the proximal ends of at least two of a plurality of cable segments forming a cable, the method comprising the steps of:

a) providing an article of manufacture having three hollow elements, each of said elements being formed from a heat shrinkable material, said heat shrinkable material having an expanded state and an unexpanded state, wherein one of said three elements is in said unexpanded state, a second one of said three elements is in said expanded state, a third one of said three elements is in said expanded state, and said three elements are coupled to constitute an integrally-formed single unit having a continuous passageway therethrough, and said third element is located between said first element and said second element;

b) positioning said unexpanded first element against a locating portion of jointbox so as to locate portions of said jointbox and cable segments within said passageway in a predetermined position such that said unexpanded first element and said locating portion have insubstantial relative movement as said article is heated in accordance with heating step c); and c) heating said article such that said second and third elements shrink to substantially attain said unexpanded state to thereby cause said second and third elements to be disposed about predetermined portions of said jointbox and cable segments in a substantially close fitting manner.

12. The method as claimed in claim 11 wherein selected ones of said elements are tubular.

13. The method as claimed in claim 11 wherein selected ones of said elements have a rectangular cross section.

14. The method as claimed in claim 11 wherein selected ones of said elements are formed from a polymer.

15. The method as claimed in claim 14 wherein said polymer is polyolefin.

16. The method as claimed in claim 15 wherein said polyolefin polymer is semi-rigid.

17. The method as claimed in claim 11 wherein selected surfaces of said article are coated with an adhesive.

18. The method as claimed in claim 17 wherein said adhesive is a polyamide adhesive.

19. The method as claimed in claim 11 further including a step d) comprising:

positioning an unexpanded first element of a second article of manufacture which is provided in accordance with step a) against a locating portion of jointbox so as to locate portions of said jointbox and cable segments within said passageway in a predetermined position such that said unexpanded first element of said second article and said locating portion have insubstantial relative movement as said article is subsequently heated.

20. A method for protecting and insulating a jointbox, said jointbox being coupled to the proximal ends of at least two of a plurality of cable segments forming a communications cable, the method comprising the steps of:

roughening a portion of the surface of a each of said proximal ends;

cleaning said roughened portions and exposed surfaces of said jointbox to remove undesired substances from said roughened portions and said exposed surfaces;

applying heat to said proximal ends and said jointbox to promote adhesion of a first adhesive;

applying a first heat shrinkable element to cover a portion of said exposed surfaces and said roughened portion of at least a first one of said plurality of cable segments, said first heat shrinkable element having said first adhesive applied to surfaces of said first element that contact said exposed surfaces and said roughened portions;

applying heat to said first element so as to shrink said first element about said exposed surfaces and said roughened portion in a substantially close fitting manner;

applying a second heat shrinkable element to substantially cover said shrunken first element and said roughened portion of at least a second one of said plurality of cable segments; and applying heat to said second heat-shrinkable polymer element so as to shrink said second heat shrinkable polymer element about said shrunken first heat-shrinkable polymer element in a substantially close fitting manner.

21. The method as claimed in claim 20 wherein selected ones of said elements are tubular.

22. The method as claimed in claim 20 wherein selected ones of said elements have a rectangular cross section.

23. The method as claimed in claim 20 wherein selected ones of said elements are formed from a polyolefin.

24. The method as claimed in claim 23 wherein said polyolefin polymer is semi-rigid.

25. The method as claimed in claim 20 wherein selected surfaces of said elements are coated with an adhesive.

26. The method as claimed in claim 25 wherein said adhesive is a polyamide adhesive.

* * * * *